United States Patent
Rehfus et al.

(10) Patent No.: US 9,527,584 B2
(45) Date of Patent: Dec. 27, 2016

(54) ELECTROMECHANICALLY ACTUATED BRAKE WITH SUPPLEMENTAL BACK DRIVE

(71) Applicant: Goodrich Corporation, Charlotte, NC (US)

(72) Inventors: Kevin Rehfus, Troy, OH (US); David Drennen, Bellbrook, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 37 days.

(21) Appl. No.: 14/598,388

(22) Filed: Jan. 16, 2015

(65) Prior Publication Data

US 2016/0207614 A1 Jul. 21, 2016

(51) Int. Cl.
| | |
|---|---|
| B64C 25/44 | (2006.01) |
| F16D 65/46 | (2006.01) |
| B60T 13/74 | (2006.01) |
| F16D 65/18 | (2006.01) |
| F16D 121/24 | (2012.01) |
| F16D 125/36 | (2012.01) |
| F16D 125/40 | (2012.01) |
| F16D 127/02 | (2012.01) |

(52) U.S. Cl.
CPC ............ B64C 25/44 (2013.01); B60T 13/741 (2013.01); F16D 65/18 (2013.01); F16D 2121/24 (2013.01); F16D 2125/36 (2013.01); F16D 2125/40 (2013.01); F16D 2127/02 (2013.01)

(58) Field of Classification Search
CPC ...... F16D 55/226; F16D 65/183; F16D 65/46; F16D 2121/16; F16D 2121/24; F16D 2125/40; F16D 2127/02; B64C 25/41; B60T 13/741; Y10T 74/18696; Y10T 74/18576
See application file for complete search history.

(56) References Cited

U.S. PATENT DOCUMENTS

| | | | |
|---|---|---|---|
| 6,257,377 B1* | 7/2001 | Schumann | F16D 65/00 188/156 |
| 6,571,921 B2* | 6/2003 | Ohtani | B60T 13/741 188/156 |
| 6,679,356 B2* | 1/2004 | Hageman | F16D 65/18 185/40 A |

(Continued)

FOREIGN PATENT DOCUMENTS

| | | |
|---|---|---|
| DE | 3724201 | 2/1989 |
| DE | 102007046953 | 4/2009 |
| GB | 2290840 | 1/1996 |

OTHER PUBLICATIONS

Extended European Search Report dated Apr. 25, 2016 in European Application No. 116151053.2.

*Primary Examiner* — Anna Momper
(74) *Attorney, Agent, or Firm* — Snell & Wilmer L.L.P.

(57) ABSTRACT

An electromechanical actuator in an aircraft brake system may include a stationary body, an actuator drive unit in an actuator drive unit housing, a ball screw coupled to the actuator drive unit, and a ball nut piston coupled to the ball screw. A supplemental back drive mechanism may be disposed between the ball screw and the stationary body. The supplemental back drive mechanism may comprise a spring and a clutch. The spring may store back drive potential energy when the electromechanical actuator is actuated to drive the ball nut piston forward, and may supply back drive energy to the retract the ball nut piston.

12 Claims, 6 Drawing Sheets

(56) References Cited

U.S. PATENT DOCUMENTS 6,938,735 B1 * 9/2005 Hilzinger ............... F16D 65/18
188/156
7,635,050 B2 * 12/2009 Yamamoto ............. F16D 65/18
188/72.8

* cited by examiner

ELECTROMECHANICALLY ACTUATED BRAKE WITH SUPPLEMENTAL BACK DRIVE

FIELD

The present disclosure relates to aircraft brake systems, and more particularly, to electromechanical actuators ("EMAs") with a supplemental back drive mechanism.

BACKGROUND

A typical aircraft braking application makes use of hydraulic adjusters that apply linear force to a brake stack. Regulated hydraulic pressure is applied to force an actuating piston outward, compressing the rotating discs and the stationary discs in the brake stack. The resulting friction causes a braking action on the wheel and tire assembly. When the hydraulic pressure is relieved, a retracting spring forces the actuating piston to retract linearly into the housing chamber leaving a predetermined running clearance between the rotating and stationary discs.

Recently, however, some aircraft braking systems are translating from hydraulic to electric actuation by making use of EMAs. This type of actuator relies on a motor and controller to create the desired amount of retraction of the piston. Alternately, if the motor loses power, the reverse efficiency of the system must be sufficient to permit back pressure from the brake stack to back drive the piston to a minimum desired clearance position to prevent a dragging brake and unsafe aircraft operation.

SUMMARY

In various embodiments, an electromechanical actuator may comprise a stationary body. An electromechanical actuator may also comprise an actuator drive unit housing containing an actuator drive unit. A ball screw may be coupled to the actuator drive unit. A ball nut piston may be coupled to the ball screw. A supplemental back drive mechanism may be disposed between the stationary body and the ball screw. The supplemental back drive mechanism may comprise a torsion spring. Forward rotation of the ball screw in response to actuation of the electromechanical actuator may produce forward rotation of the rotating end of the torsion spring. A back drive potential energy may be accumulated in the torsion spring in response to forward rotation of the rotating end of the torsion spring. The back drive potential energy may be sufficient to produce a reverse rotation of the ball screw and retraction of the ball nut piston. The supplemental back drive mechanism may also comprise a clutch. The clutch may be configured to control release of the back drive potential energy stored in the torsion spring.

In various embodiments, a method of supplying a back drive potential energy to an electromechanical actuator may comprise applying a forward drive to a ball screw in response to a first condition to produce a forward rotation of the ball screw. Forward rotation of the ball screw may increase an angular deflection of a torsion spring to produce a back drive potential energy. The back drive potential energy may be stored in the torsion spring to be supplied to the electromechanical actuator for back drive of the ball screw and retraction of a ball nut piston. A method may further comprise controlling releasing the back drive potential energy using a clutch. Releasing the back drive potential energy may produce translation of the ball nut piston to a running clearance position. Actuation of an electromechanical drive to provide a reverse drive may not be required to produce reverse rotation of the ball screw and retraction of the ball nut piston.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical, and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, an "inner surface" may comprise any surface that is situated radially inward of any other surface with respect to the axis, as defined herein, for example, labeled B-B'. Thus, an inner surface may be situated radially inward of an "outer surface" with respect to the axis B-B'.

In addition, an EMA may extend along the axis defined by the line marked B-B'. The portion near B may be referred to as proximal and the portion near B' may be referred to as distal. In that regard, B is proximal to B' and B' is distal to B.

As used herein with reference to rotation of a ball screw or other component of an EMA, "forward rotation" is rotation that causes a ball nut piston of an EMA to translate distally, and "reverse rotation" is rotation that causes a ball nut piston to translate proximally.

As used herein, the term "zero clearance position" may be used to describe a position of a ball nut piston of an EMA in which a disc or "puck" coupled to an end of the ball nut piston is in contact with and/or providing compression a brake stack of an aircraft braking system. The term "running clearance position" may be used to describe a position of a ball nut piston of an EMA in which the puck is retracted from contact with the brake stack to create a desired clearance distance between the puck and the brake stack, and the term "intermediate clearance position" may be used to describe a position of a ball nut piston in which the puck is positioned somewhere between a running clearance position and a zero clearance position.

Figure 1:
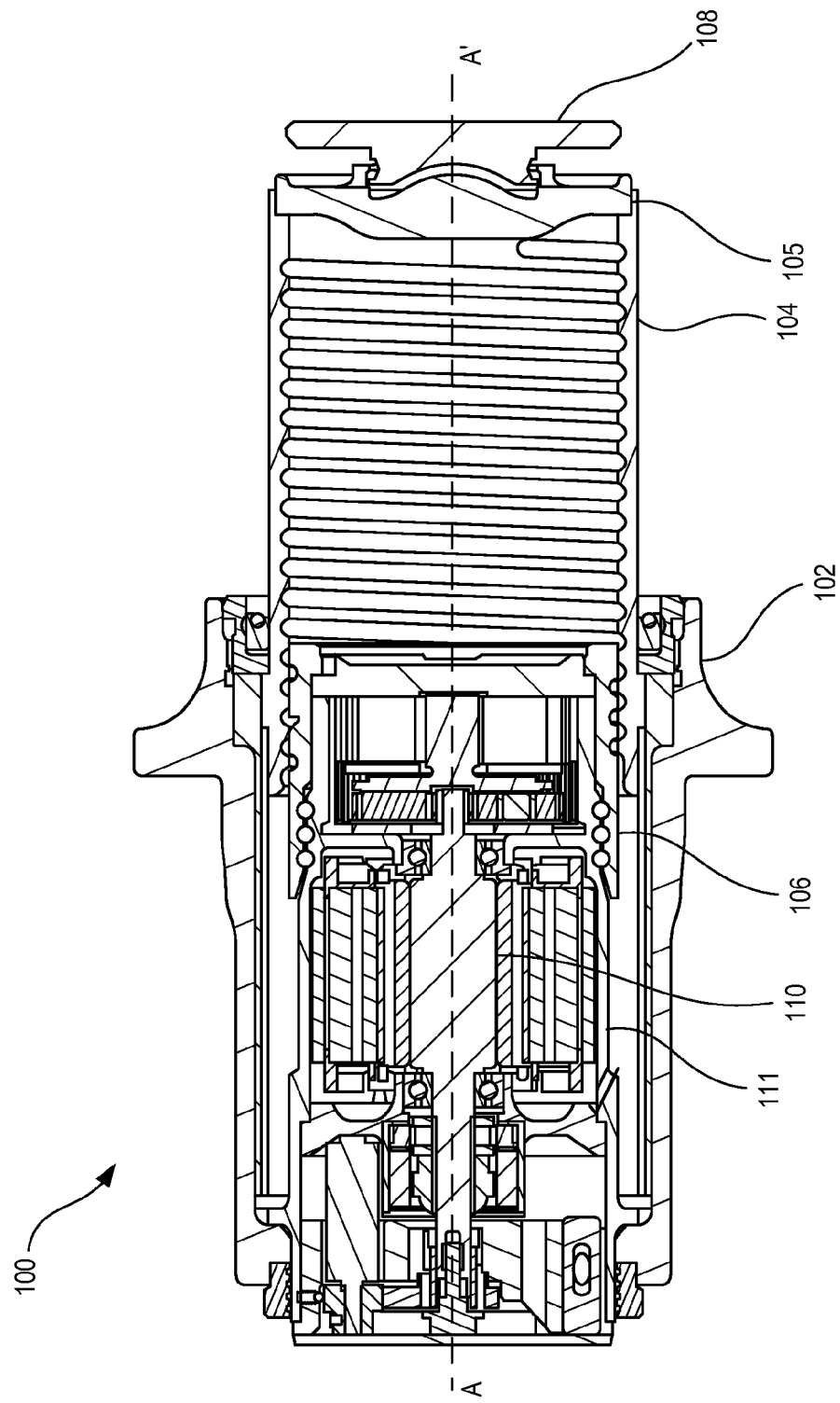
FIG. 1 illustrates a cross-sectional schematic view of a conventional EMA.

With reference to FIG. 1, a cross-sectional schematic view of a conventional EMA 100 is shown. The EMA 100 may extend along the axis marked A-A', with A being located near a proximal portion of EMA 100 and A' being located near a distal portion of EMA 100. The EMA 100 may comprise an EMA housing 102. The EMA housing 102 may extend along axis A-A' and may house a variety of components, such as a ball nut piston 104 terminating distally in an end cap 105, a ball screw 106, a puck 108 coupled to end cap 105, and an actuator drive unit ("ADU") 110. The ADU 110 may be located with an ADU housing 111. The EMA housing 102 may comprise a generally annular structure configured to house the ball nut piston 104 and extending along the axis A-A'. The ball nut piston 104 may comprise a generally annular structure that extends axially along the axis A-A' within the EMA housing 102. The ball screw 106 may comprise a generally annular structure that extends axially along the axis A-A' within the ball nut piston 104. The ADU housing 111 may comprise a generally annular structure that extends axially along the axis A-A' within the ball nut piston 104 and partially within ball screw 106. The ADU 110 may comprise a variety of drive components housed within and operably coupled to ADU housing 111, such as, for example, an electromechanical drive motor, drive shaft, gearing system, and the like. The ADU 110 may be operably coupled to ball screw 106 and may drive ball screw 106 through a plurality of rotations.

An outer surface of ball screw 106 may be helically threaded. Likewise, an inner surface of ball nut piston 104 may be helically threaded. As described above, ball screw 106 may be housed within ball nut piston 104, and the threading on the outer surface of the ball screw 106 may interface with or mate with the threading on the inner surface of the ball nut piston 104.

During operation, the ball screw 106 may rotate about an axis A-A'. As the ball screw 106 rotates, the threading in the ball screw 106 may cooperate with the threading in the ball nut piston 104 to drive (i.e., translate) the ball nut piston 104 linearly along axis A-A'. Forward rotation of ball screw 106 translates ball nut piston 104 in a distal direction. As ball nut piston 104 translates distally, puck 108 coupled to end cap 105 of ball nut piston 104 may also translate distally. Puck 108 may contact a brake stack to apply a pressure force to the brake stack, thereby slowing and/or halting the rolling motion of the aircraft wheel. A back pressure force may be transferred back through puck 108, to ball nut piston 104, to the ball screw 106, and to the ADU housing 111 supporting ball screw 106. Reverse rotation of ball screw 106 translates ball nut piston 104 in a proximal direction, retracting puck 108 away from the brake stack. In the conventional EMA 100, reverse rotation of ball screw 106 may be electromechanically driven by ADU 110 and/or the back pressure force from the brake stack.

A variety of disadvantages are associated with the conventional system illustrated in FIG. 1. For example, removal of load from the brake and retraction of puck 108 to a running clearance position under normal circumstances is provided by driving ball nut piston 104 back using the electromechanical drive motor of EMA 100. In the event of a power loss, powered back drive is not available and back pressure force from the brake stack supplies the back drive force to remove the load from the brake.

Figure 2A:
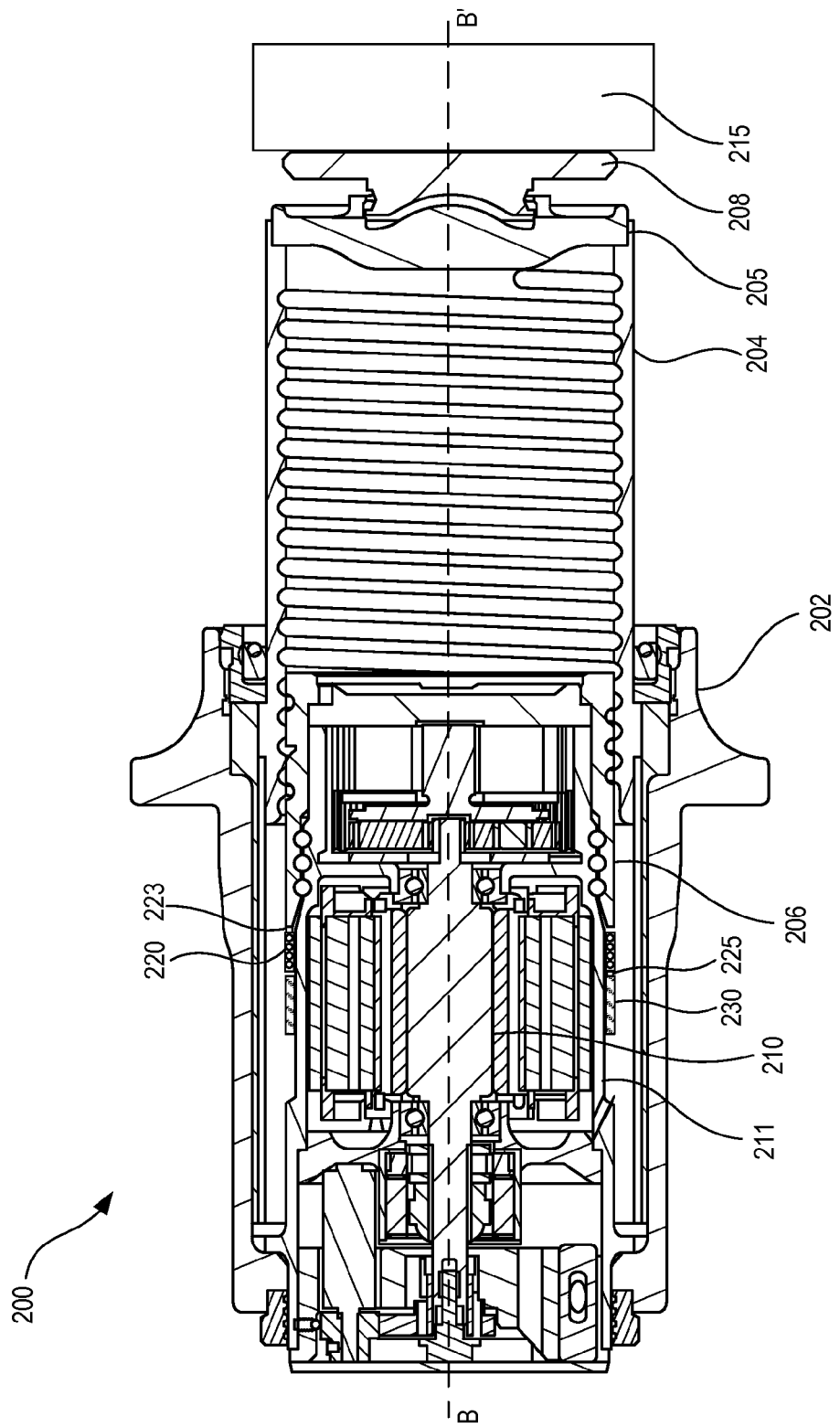
FIGS. 2A and 2B illustrate a cross-sectional schematic view of an EMA in accordance with various embodiments.
Figure 2B:
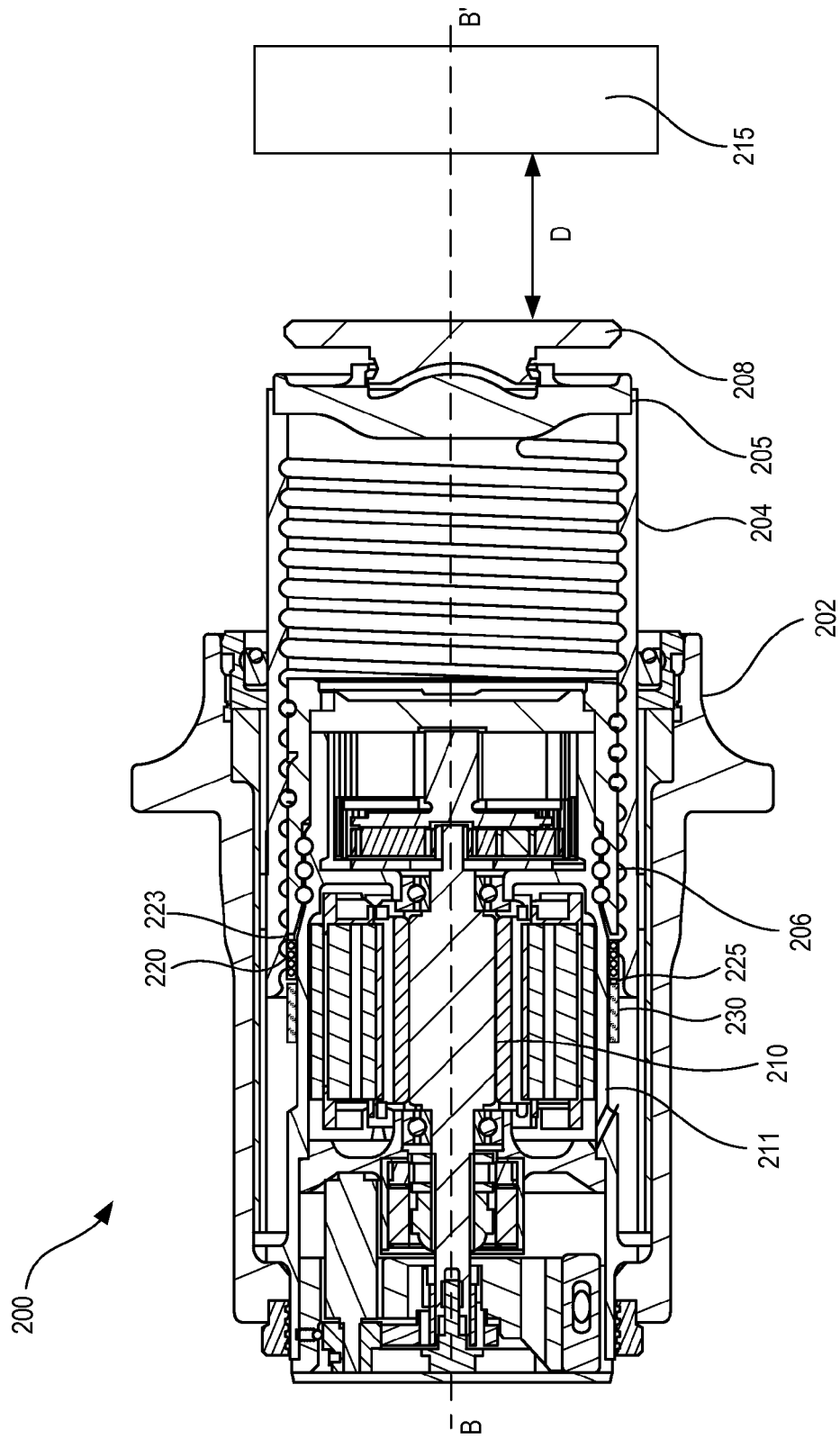

Now, with reference to FIGS. 2A and 2B, a cross-sectional schematic view of an EMA 200 in accordance with various embodiments is shown. The EMA 200 may, like the EMA 100, extend along an axis B-B', with B being located near a proximal portion of EMA 200 and B' being located near a distal portion of EMA 200. As above, the EMA 200 may comprise an EMA housing 202. The EMA housing 202 may extend along axis B-B' and may house a variety of components, such as a ball nut piston 204 terminating in an end cap 205, a ball screw 206, a puck 208 coupled to end cap 205, and an ADU 210. The ADU 210 may be located with an ADU housing 211. The EMA housing 202 may comprise a generally annular structure configured to house the ball nut piston 204 and extending along the axis B-B'. The ball nut piston 204 may comprise a generally annular structure that extends axially along the axis B-B' within the EMA housing 202. The ball screw 206 may comprise a generally annular structure that extends axially along the axis B-B' within the ball nut piston 204. ADU housing 211 may comprise a generally annular structure that extends axially along the axis B-B' within ball nut piston 204 and partially within ball screw 206. ADU 210 may comprise a variety of drive components housed within and operably coupled to ADU housing 211, such as, for example, an electromechanical drive motor, drive shaft, gearing system, and the like. ADU 210 may be operably coupled to ball screw 206 and may drive ball screw 206 through a plurality of rotations.

EMA 200 may operate in a manner similar to that described above with respect to EMA 100, with actuation of the electromechanical drive producing forward rotation of ball screw 206, and forward rotation of ball screw 206 producing translation of ball nut piston 204 in a distal linear direction. Likewise, as ball nut piston 204 translates distally, puck 208 coupled to ball nut piston 204 may also translate distally. Puck 208 may contact a brake stack 215 to apply a pressure force to the brake stack, thereby slowing and/or halting the rolling motion of the aircraft wheel. A back pressure force may be transferred back through puck 208, to ball nut piston 204, to the ball screw 206, and to the ADU housing 211 supporting ball screw 206 by virtue of the drivetrain of ADU 210. Reverse rotation of ball screw 206 may translate ball nut piston 204 in a proximal direction, retracting puck 208 away from the brake stack 215. Reverse rotation of ball screw 206 may be electromechanically driven by ADU 210 and/or the back pressure force from the brake stack.

In various embodiments, EMA 200 may also comprise a supplemental back drive mechanism disposed between the ball screw 206 and the ADU housing 211. A supplemental back drive mechanism may comprise a spring 220. Spring 220 may comprise a generally annular device located outside of ADU housing 211 and adjacent to a proximal end of ball screw 206. Spring 220 may be configured to fit within ball nut piston 204 when ball nut piston 204 is in a retracted position. Spring 220 may have a rotating end 223 and a stationary end 225. Rotating end 223 may be coupled, retained, installed, and/or otherwise captured in a structure of ball screw 206. In various embodiments, stationary end 225 may be directly or indirectly coupled, retained, installed, and/or otherwise captured in a stationary body. A stationary body may be any structure of EMA 200 that does not rotate about axis B-B'. For example, stationary end 225 may be directly coupled to a stationary body such as EMA housing 202 or ADU housing 211. Likewise, stationary end 225 may be indirectly coupled to a stationary body such as EMA housing 202 or ADU housing 211 by means of an intermediate structure associated with the stationary body (i.e., by means of a serial connection), such as a clutch 230, described in greater detail below.

In various embodiments, spring 220 may be any suitable spring. For example, spring 220 may be a wrap spring, a spiral spring, and/or a helical torsion spring. Spring 220 may be configured to store a back drive potential energy or torsional force suitable to provide back drive energy for EMA 200 and the associated brake drive system. In various embodiments, spring 220 may be fabricated from round or square spring wire, machined from solid bar stock, or molded from plastic material. The material of spring 220 may be chosen to achieve corrosion resistance and sustain its properties at low as well as high ambient temperatures ranging from approximately −65° F. (−53° C.) to 350° F. (176° C.). Likewise, the materials and configuration of spring 220 may be selected to provide various desired spring performance specifications such as a torsion coefficient and/or spring rate. For example, in various embodiments, spring 220 may comprise a torsion spring with a spring rate of 0.215 N-m/radian. Such a torsion spring may provide a torque build-up of 0.5 N-m with an angular deflection of 133 degrees. The energy stored by a torsion spring with these specifications may be suitable to provide 0.075 inches (~1.9 mm) of back drive or linear retraction of ball nut piston 204, which may be suitable to provide a desired running clearance position of EMA 200. In various embodiments, other springs having other specifications are possible, and a spring 220 may be configured to provide any suitable maximum angular deflection, spring rate, and torque capacity to thereby provide a back drive energy capacity matched to the characteristics of any particular EMA and/or brake system.

In operation, spring 220 may be loaded with a torsional force or back drive potential energy. The back drive potential energy may be accumulated or stored by spring 220 in response to actuation of EMA 200 and forward rotation of ball screw 206, for example, during a braking operation. Forward rotation of ball screw 206 may produce rotation of rotating end 223 of spring 220, with rotation of the rotating end 223 producing an increased angular deflection of the spring and an accumulation of a back drive potential energy. In various embodiments, spring 220 may be loaded by rotation of rotating end 223 in any suitable direction (e.g., clockwise or counter-clockwise) in response to forward rotation of ball screw 206.

In various embodiments, the accumulated back drive potential energy in spring 220 may provide sufficient back drive energy (i.e., kinetic energy) to produce reverse rotation of ball screw 206 and retraction of ball nut piston 204, for example, to a running clearance position producing a running clearance position distance D between puck 208 and brake stack 215, when spring 220 is released. Thus, in various embodiments, actuation of EMA 200 in a reverse direction electromechanically driven by ADU 210 may not be present to produce reverse rotation of ball screw 206 and retraction of ball nut piston 204 to a running clearance position or an intermediate clearance position, for example, in the event of a power loss to ADU 210. Likewise, EMA 200 may not rely on back pressure from the brake stack to produce reverse rotation of ball screw 206 and retraction of ball nut piston 204. However, in various embodiments, under normal powered operation, spring 220 may assist reverse electromechanically driven retraction of ball nut piston 204 to a running clearance position.

Figure 3A:
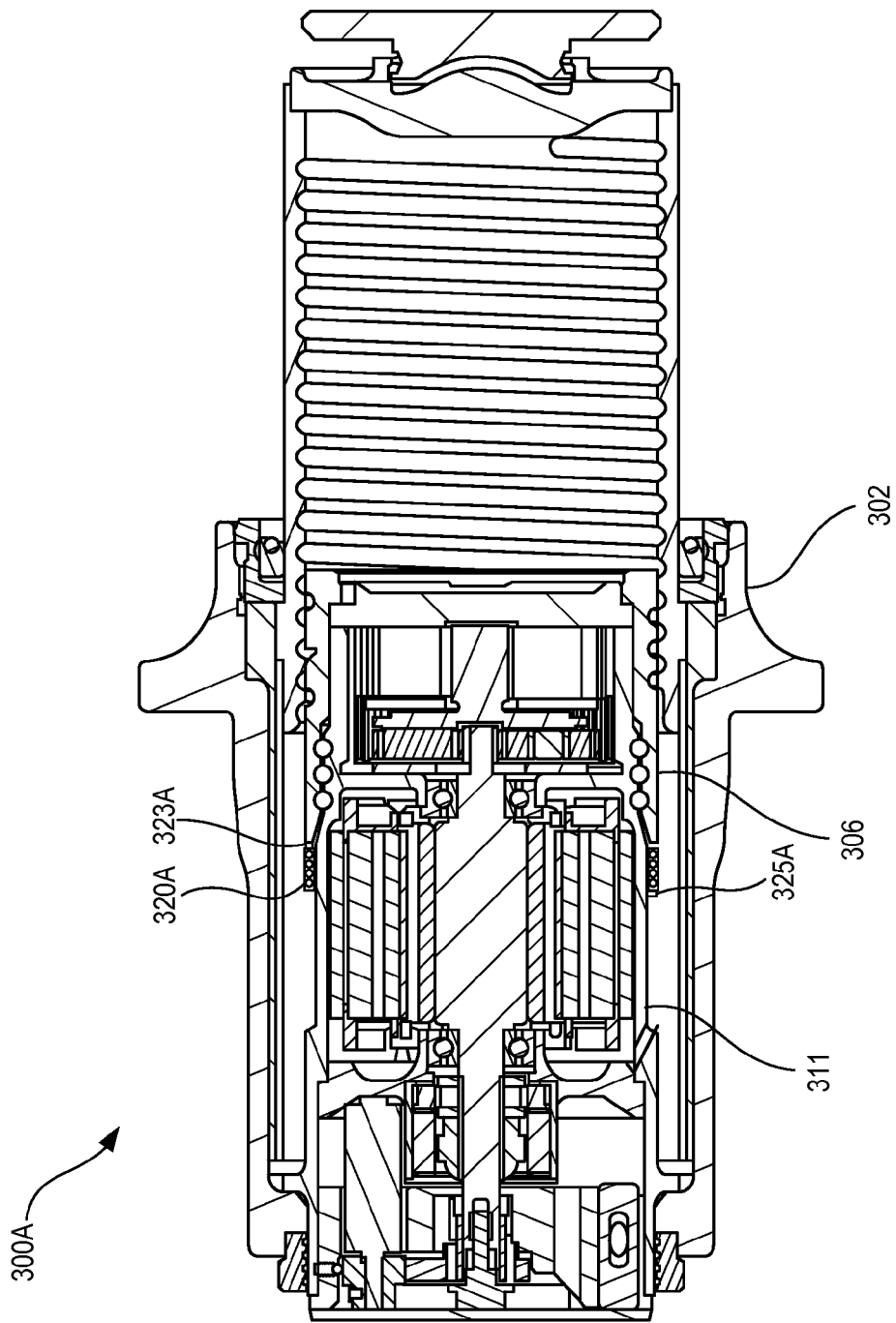
FIGS. 3A and 3B illustrate cross-sectional schematic views of EMAs in accordance with various embodiments.
Figure 3B:
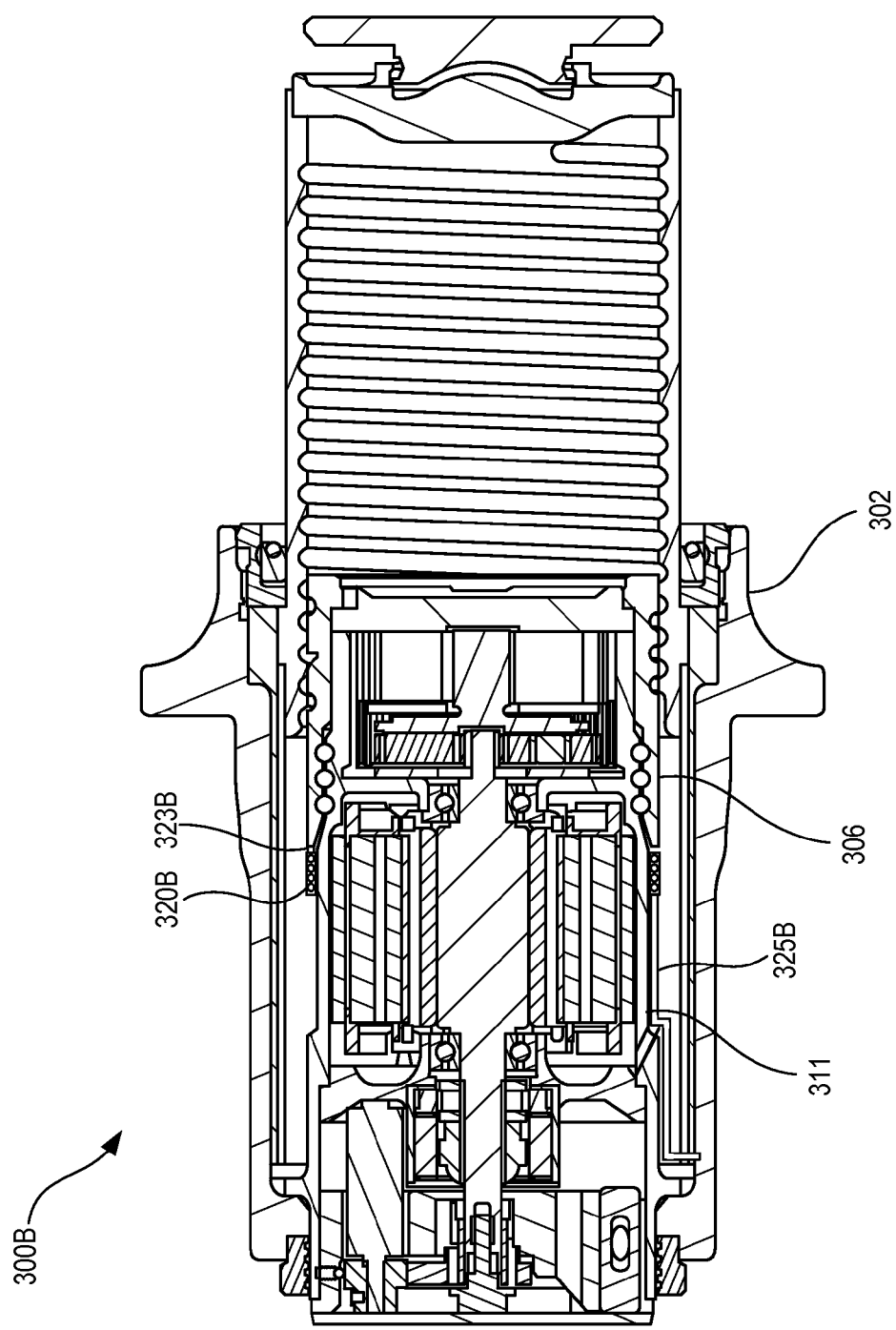

In various embodiments and with reference to FIGS. 3A and 3B, an EMA may comprise a supplemental back drive mechanism coupled to a stationary body. For example and as illustrated in FIG. 3A, EMA 300A may comprise spring 320A coupled to ADU housing 311. Rotating end 323A of spring 320A may be coupled to ball screw 306, while stationary end 325A of spring 320A may be attached directly to ADU housing 311. Likewise, and as illustrated in FIG. 3B, EMA 300B may comprise spring 320B coupled to EMA housing 302. Rotating end 323B of spring 320B may be coupled to ball screw 306, while stationary end 325B of spring 320B may be attached directly to EMA housing 302. In various embodiments, stationary end 325B may attach directly or indirectly to EMA housing 302.

With reference again to FIGS. 2A and 2B, a supplemental back drive mechanism may comprise a clutch 230. In various embodiments, stationary end of 225 of spring 220 may be coupled to a clutch 230. Clutch 230 may be located outside of and attached to a stationary body such as ADU housing 211 or EMA housing 202. Clutch 230 may further be located adjacent to a proximal end of spring 220 and attached to the stationary end 225 thereof. Similar to spring 220, clutch 230 may be configured to fit within ball nut piston 204 when ball nut piston 204 is in a retracted position. Thus, stationary end 225 of spring 220 may be indirectly coupled to a stationary body such as ADU housing 211 or EMA housing 202 by means of a serial connection to clutch 230 coupled to ADU housing 211 or EMA housing 202.

In operation, clutch 230 may control release of the back drive potential energy that may be stored in spring 220. In various embodiments, clutch 230 may be any suitable clutch, for example, a mechanical slip clutch or an electronic clutch. In various embodiments, clutch 230 may control loading and/or release of spring 220. For example, clutch 230 may prevent spring 220 from exceeding a torsion limit relative to the torque build up (i.e., the accumulation of back drive potential energy) and/or the angular deflection of the rotating end 223.

Likewise, clutch 230 may control loading of spring 220 by controlling rotation of stationary end 225, such as by variously locking or permitting rotation of stationary end 225 in response to various conditions of clutch 230 or another component of EMA 200. For example, clutch 230 may remain unlocked and permit rotation of stationary end 225 and torsion spring 220 during actuation of EMA 200 in an initial braking period in which ball nut piston 204 and puck 208 advance from a running clearance position to a zero clearance position. A contact sensor in EMA 200 may signal a change of condition to clutch 230 when puck 208 reaches a zero clearance position, locking clutch 230 and stationary end 225 with respect to ADU housing 211, with further rotation of ball screw 206 subsequently loading spring 220 to provide back drive potential energy. Operation in this manner may provide for a decreased response time of EMA 200 during initial actuation of aircraft braking.

In various embodiments, clutch 230 may control release of back drive potential energy in response to a change of condition of clutch 230 or another component of EMA 200. For example, clutch 230 may release back drive potential energy automatically in response to discontinuing actuation of forward electromechanical drive of ADU 210 during braking or in response to actuation of reverse electromechanical drive of ADU 210, in which case spring 220 may assist electromechanical back drive of ball nut piston 204 to a running clearance position. In various embodiments, clutch 230 may release back drive potential in response to various other signals, such as a signal corresponding to a power loss by EMA 200, with spring 220 providing a failsafe mechanism for back drive of ball nut piston 204.

In various embodiments, a supplemental back drive mechanism of EMA 200 may provide various advantages over conventional EMA 100. As described above, the supplemental back drive provided by spring 220 may provide failsafe back drive operation in the event of a power failure to prevent unsafe operating conditions during a period of power loss to EMA 200. In various embodiments, the supplemental back drive provided by spring 220 may also decrease the response time of electromechanically driven retraction of ball nut piston 204 to a running clearance position, thereby enhancing the performance of EMA 200 during normal powered operation.

In various embodiments, the supplemental back drive provided by spring 220 may also extend the operational life of EMA 200 by overcoming increasing mechanical inefficiency that may occur over the operational life of EMA 200. For example, a new EMA may have an overall mechanical efficiency of 75%. The overall mechanical efficiency of an EMA may decrease over time as the drivetrain becomes worn, with a conventional EMA requiring replacement when the overall mechanical efficiency approaches, for example, 60% efficiency. An EMA 200 with supplemental back drive provided by spring 220 may lower the mechanical efficiency lower limit to, for example, 45% efficiency, thereby extending the operational lifespan of EMA 200.

In various embodiments, an EMA 200 with supplemental back drive provided by spring 220 may also be designed and manufactured using a lower efficiency drivetrain. For example, in various embodiments, an Acme screw may be substituted for a ball screw 206. In that regard, in various embodiments, EMA 200 may have a lower efficiency and may thereby decrease the complexity and costs of EMA 200 as compared to a conventional EMA 100 without a supplemental back drive.

Figure 4:
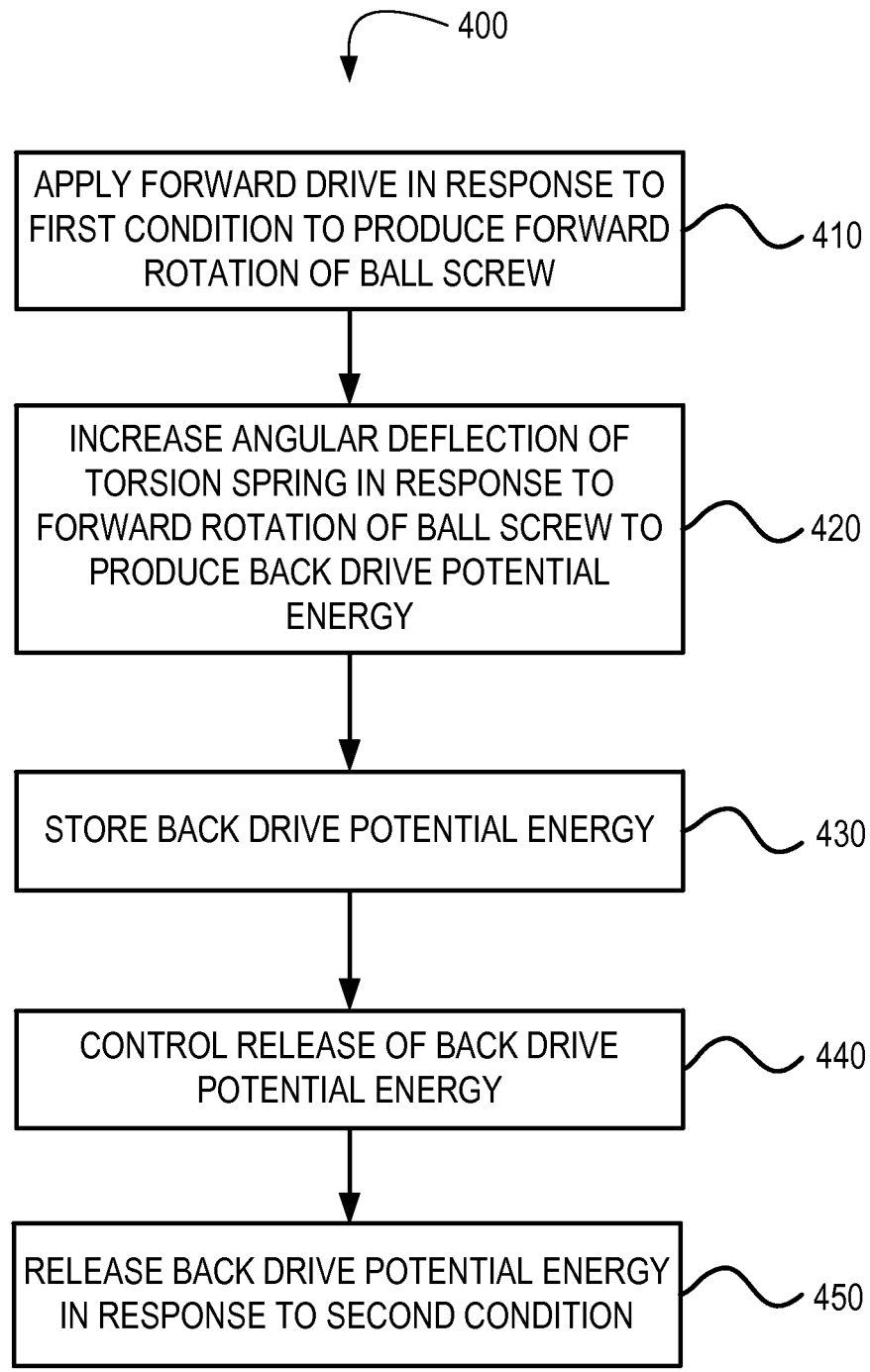
FIG. 4 illustrates a flow chart of a process for providing a back drive in an EMA in accordance with various embodiments.

Referring to FIG. 4, a flow chart 400 of a method of supplying a back drive potential energy to EMA 200 is provided. A method of supplying a back drive potential energy may comprise applying a forward drive to ball screw 206 in response to a first condition to produce a forward rotation of ball screw 206 (step 410). In various embodiments, a first condition may comprise actuation of EMA 200 for braking of an aircraft. Forward rotation of ball screw 206 may produce a distal linear displacement of ball nut piston 208. Distal linear displacement of ball nut piston 204 may produce a decreased clearance position between puck 208 and brake stack 215, for example, to a zero clearance position (FIG. 2A). In various embodiments, a method may further comprise increasing an angular deflection of torsion spring 220 in response to the forward rotation of ball screw 206 to produce a back drive potential energy (step 420). The back drive potential energy may be stored in torsion spring 220 (step 430) to supply back drive potential energy to EMA 200. In various embodiments, a method may further comprise controlling releasing the back drive potential energy using clutch 230 (step 440). The back drive potential energy may be released in response to a second condition (step 450). Releasing the back drive potential energy may produce a reverse rotation of ball screw 206, which may be translated to a retraction of ball nut piston 204 and an increased clearance distance between puck 208 and brake stack 215, such as a running clearance position distance D (FIG. 2B) or an intermediate clearance position distance. In various embodiments, reverse rotation of ball screw 206 and retraction of ball nut piston 204 may be produced without regard to actuation of a reverse electromechanical drive.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electromechanical actuator ("EMA") comprising:
   a stationary body;

an actuator drive unit ("ADU") housing;
an ADU housed within and operably coupled to the ADU housing;
a ball screw operably coupled to the ADU;
a ball nut piston operably coupled to the ball screw;
a back drive mechanism comprising a torsion spring disposed between the stationary body and the ball screw, wherein the torsion spring comprises a stationary end and a rotating end configured to rotate about the ADU housing and wherein the stationary end is at least one of directly or indirectly coupled to the stationary body and the rotating end is coupled to the ball screw; and
a clutch attached to the stationary end of the torsion spring, wherein the clutch is configured to control a back drive potential energy stored in the torsion spring.

2. The EMA of claim 1, wherein a forward rotation of the ball screw is produced in response to actuation of the EMA, wherein the forward rotation of the ball screw produces a forward rotation of the rotating end of the torsion spring, and wherein the back drive potential energy is accumulated in the torsion spring in response to the forward rotation of the rotating end of the torsion spring.

3. The EMA of claim 2, wherein the back drive potential energy is suitable to produce a reverse rotation of the ball screw, and wherein the ball nut piston is retracted in response to the reverse rotation of the ball screw.

4. The EMA of claim 3, wherein the ball nut piston is retracted without application of a reverse electromechanical drive.

5. The EMA of claim 1, wherein the clutch is at least one of a mechanical slip clutch or an electronic clutch.

6. The EMA of claim 1, wherein the clutch is configured to control loading of the torsion spring and thereby is configured to control initiation of storage of the back drive potential energy in the torsion spring.

7. A method comprising:
applying a forward drive to a ball screw in response to a first condition to produce a forward rotation of the ball screw;
increasing an angular deflection of a torsion spring by the forward rotation of the ball screw to produce a back drive potential energy, wherein the torsion spring is attached to a clutch;
storing the back drive potential energy in the torsion spring; and
controlling the back drive potential energy via the clutch.

8. The method of claim 7, further comprising releasing the back drive potential energy in response to a second condition.

9. The method of claim 8, wherein the releasing the back drive potential energy produces a reverse rotation of the ball screw, and wherein the reverse rotation of the ball screw is translated to a retraction of a ball nut piston.

10. The method of claim 9, wherein the ball nut piston is translated to a running clearance position.

11. The method of claim 10, wherein the ball nut piston is translated without application of a reverse electromechanical drive.

12. The method of claim 7, further comprising a puck coupled to a ball nut, wherein increasing the angular deflection of the torsion spring is subsequent to the puck reaching a zero clearance position with respect to a brake stack of an aircraft.

* * * * *